(12) United States Patent
Hsieh

(10) Patent No.: US 8,097,835 B2
(45) Date of Patent: Jan. 17, 2012

(54) TEMPERATURE CONTROL CIRCUIT

(75) Inventor: Ming-Chih Hsieh, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/755,401

(22) Filed: Apr. 6, 2010

(65) Prior Publication Data

US 2011/0160931 A1 Jun. 30, 2011

(30) Foreign Application Priority Data

Dec. 28, 2009 (TW) ................................ 98145234 A

(51) Int. Cl.
*H05B 1/02* (2006.01)

(52) U.S. Cl. ......................... 219/494; 219/481; 219/506

(58) Field of Classification Search ................... 219/494, 219/497, 501, 504, 505–508
See application file for complete search history.

(56) References Cited

U.S. PATENT DOCUMENTS

| | | | | |
|---|---|---|---|---|
| 6,080,971 | A * | 6/2000 | Seitz et al. | 219/483 |
| 6,466,024 | B1 * | 10/2002 | Rogers | 324/427 |
| 6,998,584 | B1 * | 2/2006 | Luo | 219/486 |
| 7,006,900 | B2 * | 2/2006 | Zhenduo et al. | 700/299 |

* cited by examiner

*Primary Examiner* — Mark Paschall
(74) *Attorney, Agent, or Firm* — Altis Law Group, Inc.

(57) ABSTRACT

A temperature control circuit includes a microprocessor, a protection module, a temperature detecting module, and a heating module. The temperature detecting module includes a thermistor and a first switch. The thermistor is operable to sense a temperature to turn on or off the first switch for outputting a detection signal to the microprocessor and the protection module. The protection module is operable to control the microprocessor to work or reset according to the detection signal. The heating module includes a heater and a second switch. The microprocessor controls the second switch to turn on or off for making the heater work or stop working according to the detection signal.

20 Claims, 2 Drawing Sheets

TEMPERATURE CONTROL CIRCUIT

CROSS-REFERENCE TO RELATED APPLICATIONS

Relevant subject matter is disclosed in two co-pending U.S. patent applications 12/755,402, and 12/755,400 filed on the same date and having the same title, which are assigned to the same assignee as this patent application.

BACKGROUND

1. Technical Field

The present disclosure relates to a temperature control circuit.

2. Description of Related Art

When the temperature is within a range from 0 degrees Celsius to 70 degrees, most electronic devices operate properly. However, when the temperature is too low, such as 10 degrees below zero, some electronic devices cannot work properly. Therefore, an effective temperature control circuit is beneficial for control the working temperature for many electronic devices.

DETAILED DESCRIPTION

Figure 1:
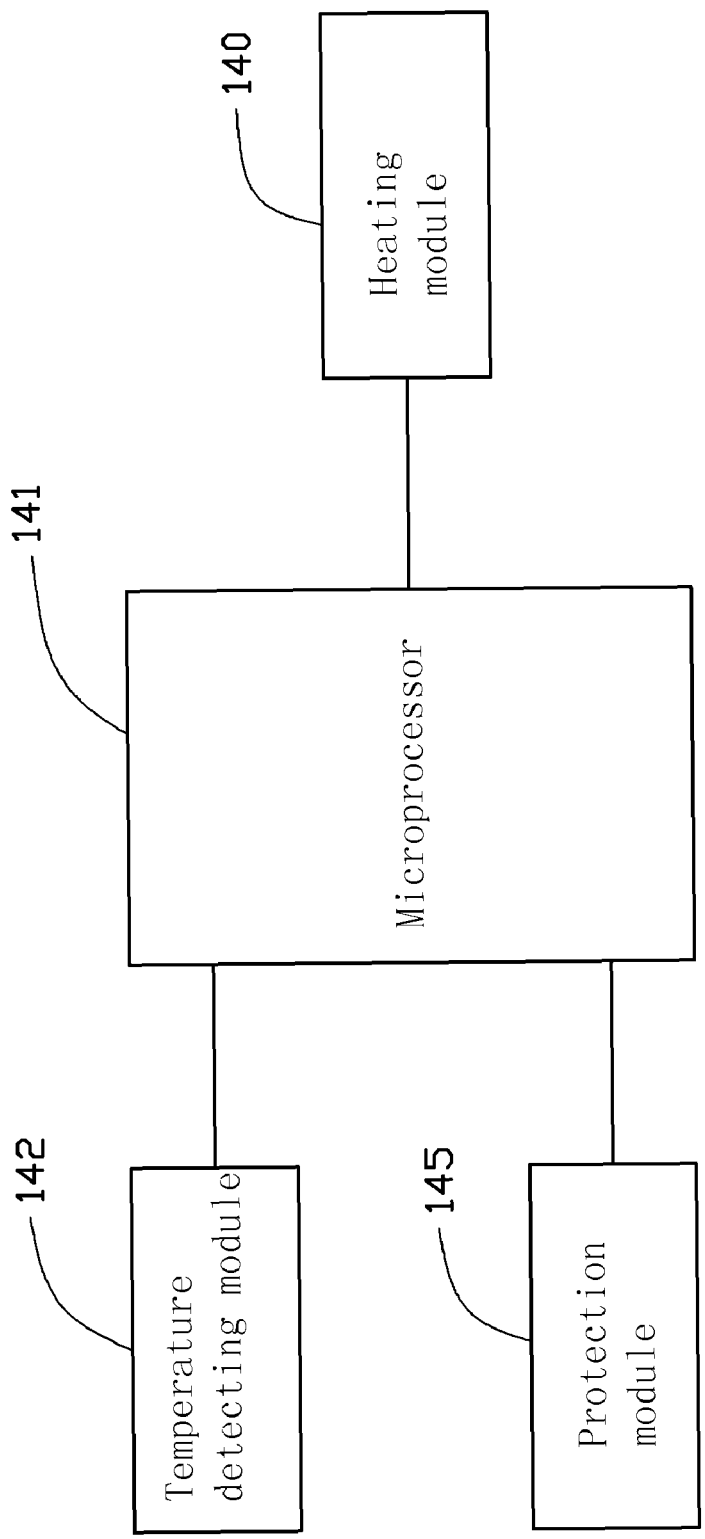
FIG. 1 is a schematic block diagram of an exemplary embodiment of a temperature control circuit.

Referring to FIG. 1, an exemplary embodiment of a temperature control circuit 14 is used in an electronic device to make the electronic device operate properly. The temperature control circuit 14 includes a microprocessor 141, a heating module 140, a temperature detecting module 142, and a protection module 145. The heating module 140, the temperature detecting module 142, and the protection module 145 all connect to the microprocessor 141. When the electronic device powers on, the microprocessor 141 controls the heating module 142 to heat the electronic device. The temperature detecting module 142 detects the temperature of the electronic device for outputting a detection signal to the protection module 145 and the microprocessor 141. The protection module 145 controls a status of the microprocessor 141. The microprocessor 141 controls the heating module 140 to work or not to work according to the detection signal.

Figure 2:
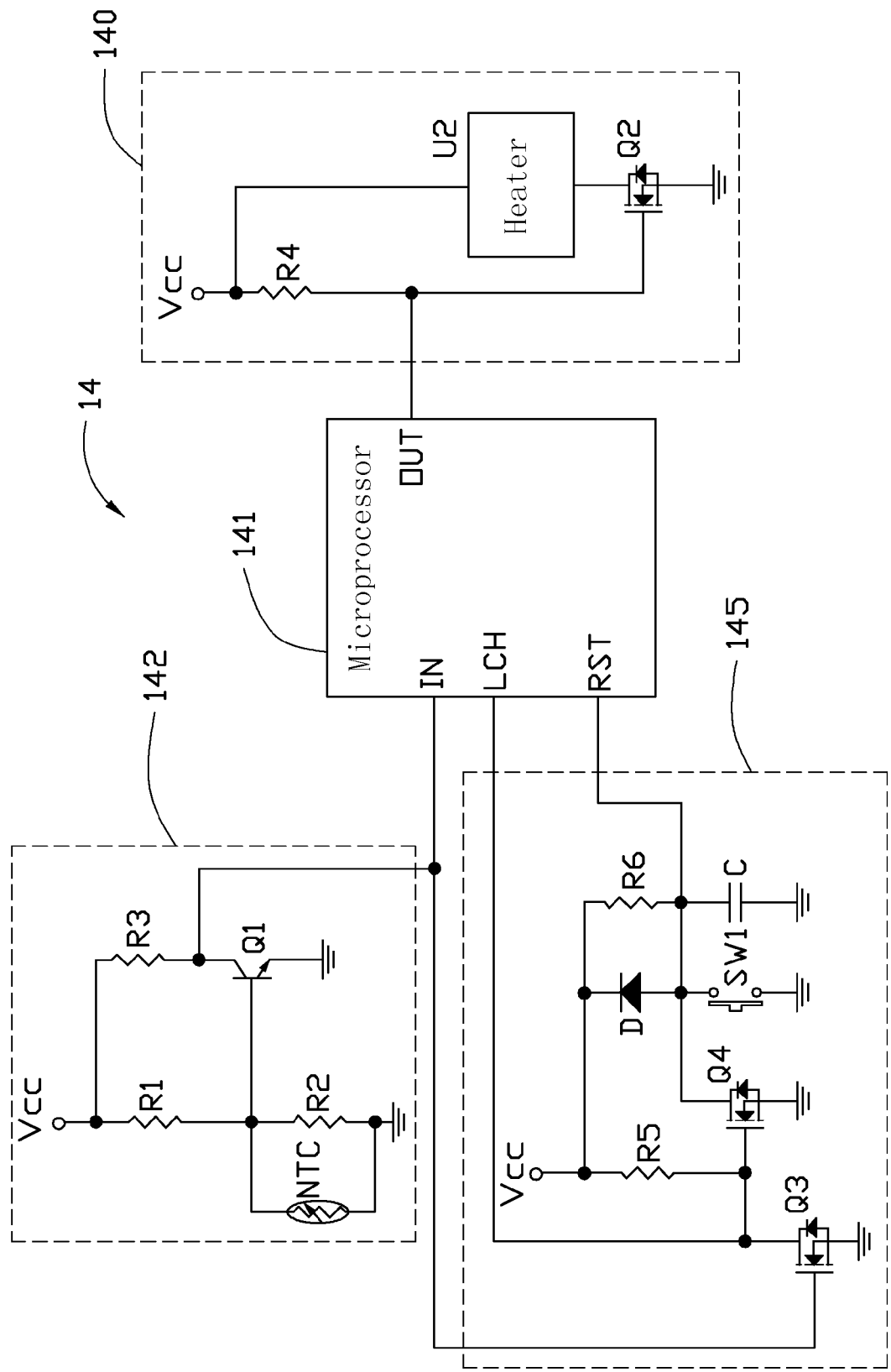
FIG. 2 is a circuit diagram of the temperature control circuit in FIG. 1.

Referring to FIG. 2, the temperature detecting module 142 includes a thermistor and a transistor Q1. The heating module 140 includes a metal oxide semiconductor field-effect transistor (MOSFET) Q2 and a heater U2. The protection module 145 includes two MOSFETs Q3 and Q4, a diode D, and a switch SW1. In this embodiment, the thermistor is a negative temperature coefficient thermistor NTC. The heater U2 is a positive temperature coefficient heater. The heater U2 and the MOSFET Q2 will operate properly when the temperature is too low, such as 30 degrees below zero.

A base of the transistor Q1 connects to a power source Vcc via a resistor R1. The base of the transistor Q1 further grounds via a resistor R2. The resistor R2 connects to the thermistor NTC in parallel. A collector of the transistor Q1 connects to the power source Vcc via a resistor R3, and connects to an input pin IN of the microprocessor 141 directly. An emitter of the transistor Q1 goes to ground.

A gate of the MOSFET Q2 connects to an output pin OUT of the microprocessor 141, and connects to the power source Vcc via a resistor R4. A drain of the MOSFET Q2 connects to the power source Vcc via the heater U2. A source of the MOSFET Q2 goes to ground.

A gate of the MOSFET Q3 connects to the input pin IN of the microprocessor 141. A source of the MOSFET Q3 goes to ground. A drain of the MOSFET Q3 connects to a gate of the MOSFET Q4 and a data pin LCH of the microprocessor 141. The gate of the MOSFET Q4 further connects to the power source Vcc via a resistor R5. A source of the MOSFET Q4 goes to ground. A drain of the MOSFET Q4 connects to a reset pin RST of the microprocessor 141. A first terminal of the switch SW1 connects to the reset pin RST of the microprocessor 141. A second terminal of the switch SW1 goes to ground. A capacitor C connects to the switch SW1 in parallel. An anode of the diode D connects to the reset pin RST of the microprocessor 141. A cathode of the diode D connects to the power source Vcc. A resistor R6 connects to the diode D in parallel. The diode D is operable to protect the MOSFET Q4. The switch SW1 is operable to reset the microprocessor 141.

If the working temperature range of the electronic device is within 0 degrees to 70 degrees within which the electronic device will operate properly and when the electronic device powers on in a temperature below zero, the temperature control circuit 14 will operate. At this moment, the output pin OUT of the microprocessor 141 increases to a high voltage level via the power source Vcc and the resistor R4. The MOSFET Q2 turns on. As a result, the heater U2 starts to work for increasing the temperature of the electronic device.

Before the temperature of the electronic device reaches an operating temperature, such as 0 degrees, the microprocessor 141 cannot operate properly. At this moment, a resistance of the thermistor NTC is large. As a result, a voltage on the thermistor NTC is at a high level. The transistor Q1 turns on. The input pin IN of the microprocessor 141 is at a low voltage level. The gate of the MOSFET Q3 is at a low voltage level. The MOSFET Q3 turns off. The gate of the MOSFET Q4 is at a high voltage level. The MOSFET Q4 turns on. As a result, the reset pin RST of the microprocessor 141 is at a low voltage level. The microprocessor 141 is in a reset state. In other words, the microprocessor 141 does not start the electronic device. In addition, the output pin OUT of the microprocessor 141 increases to a high voltage level to make the heater U2 heat continuously.

When the temperature of the electronic device reaches the operating temperature, the resistance of the thermistor NTC is low. As a result, a voltage on the thermistor NTC is at a low level. The transistor Q1 turns off. The input pin IN of the microprocessor 141 is at a high voltage level. The output pin OUT of the microprocessor 141 is at a low voltage level to turn off the heater U2. At the same time, the gate of the MOSFET Q3 is at a high voltage level. The MOSFET Q3 turns on. The gate of the MOSFET Q4 is at a low voltage level. The MOSFET Q4 turns off. As a result, the reset pin RST of the microprocessor 141 is at a high voltage level. The microprocessor 141 starts to work. In other words, the microprocessor 141 starts the electronic device. After the electronic device operates properly, the data pin LCH outputs a low voltage level all the time to make the reset pin RST of the microprocessor 141 be at a high voltage level. As a result, to reset the microprocessor 141, users must press the switch SW1.

After the heater U2 stops working, if the temperature of the electronic device is under the operating temperature, the transistor Q1 turns on. As a result, the heater U2 starts to work. In this way, the electronic device can keep on operating properly.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A temperature control circuit used in an electronic device, the temperature control circuit comprising:
   a microprocessor;
   a protection module connected to the microprocessor;
   a temperature detecting module comprising a thermistor and a first switch, wherein the thermistor is operable to sense a temperature of the electronic device and turn on or off the first switch for outputting a detection signal to the microprocessor and the protection module, the protection module is operable to output a control signal according to the detection signal, the microprocessor is controllable to be in a work state or a standby state according to the control signal from the protection module; and
   a heating module comprising a heater, wherein the microprocessor turns on or off the heater according to the detection signal, when the temperature of the electronic device is lower than a preset operating temperature, the first switch is turned on by the thermistor to make the protection module control the microprocessor to be in a standby state wherein the electronic device is deactivated and the heater is turned on; when the temperature of the electronic device is higher than the preset operating temperature, the first switch is turned off to control the microprocessor to enter the work state wherein the electronic device is activated and the heater is turned off.

2. The temperature control circuit of claim 1, wherein the first switch is a transistor, a base of the transistor grounds via the thermistor, and connects to a power source via a first resistor, a collector of the transistor connects to the power source via a second resistor, and connects to an input pin of the microprocessor, and an emitter of the transistor grounds.

3. The temperature control circuit of claim 2, wherein the thermistor connects to a third resistor in parallel.

4. The temperature control circuit of claim 2, wherein the thermistor is a negative temperature coefficient thermistor.

5. The temperature control circuit of claim 2, wherein the protection module comprises a first metal-oxide-semiconductor field-effect transistor (MOSFET) and a second MOSFET, a gate of the first MOSFET connects to the input pin of the microprocessor, a drain of the first MOSFET connects to a data pin of the microprocessor and a gate of the second MOSFET, the gate of the second MOSFET further connects to the power source via a third resistor, a drain of the second MOSFET connects to a reset pin of the microprocessor, and sources of the first and second MOSFETs ground.

6. The temperature control circuit of claim 5, wherein the protection module further comprises a diode and a fourth resistor, an anode of the diode connects to the reset pin of the microprocessor, a cathode of the diode connects to the power source, and the fourth resistor connects to the diode in parallel.

7. The temperature control circuit of claim 5, wherein the protection module further comprises a switch and a capacitor, a first terminal of the switch connects to the reset pin of the microprocessor, a second terminal of the switch grounds, and the capacitor connects to the switch in parallel.

8. The temperature control circuit of claim 1, wherein the heating module further comprises a second switch to control turning on or off of the heater, and the microprocessor controls turning on or off of the second switch.

9. The temperature control circuit of claim 8, wherein the second switch is a metal-oxide-semiconductor field-effect transistor (MOSFET), a gate of the MOSFET connects to a power source via a first resistor, and connects to an output pin of the microprocessor, a drain of the MOSFET connects to the power source via the heater, and a source of the MOSFET grounds.

10. A temperature control circuit used in an electronic device, the temperature control circuit comprising:
    a microprocessor;
    a protection module connected to the microprocessor;
    a heating module; and
    a temperature detecting module to detect a temperature of the electronic device and output a detection signal to the microprocessor and the protection module, wherein the protection module outputs a reset signal to the microprocessor to keep the microprocessor in a standby state in which the electronic device is not activated, and the microprocessor turns on the heating module to generate heat before the temperature reaches an operating temperature; and wherein the protection module controls the microprocessor to be in a working state in which the electronic device is activated, and to turn off the heating module when the temperature reaches the operating temperature.

11. The temperature control circuit of claim 10, wherein the temperature detecting module comprises a thermistor and a transistor, a base of the transistor grounds via the thermistor, and connects to a power source via a first resistor, a collector of the transistor connects to the power source via a second resistor, and connects to an input pin of the microprocessor, and an emitter of the transistor grounds.

12. The temperature control circuit of claim 11, wherein the thermistor connects to a third resistor in parallel.

13. The temperature control circuit of claim 11, wherein the thermistor is a negative temperature coefficient thermistor.

14. The temperature control circuit of claim 10, wherein the protection module comprises a first metal-oxide-semiconductor field-effect transistor (MOSFET) and a second MOSFET, a gate of the first MOSFET connects to the input pin of the microprocessor, a drain of the first MOSFET connects to a data pin of the microprocessor and a gate of the second MOSFET, the gate of the second MOSFET further connects to the power source via a third resistor, a drain of the second MOSFET connects to a reset pin of the microprocessor, and sources of the first and second MOSFETs ground.

15. The temperature control circuit of claim 14, wherein the protection module further comprises a diode and a fourth resistor, an anode of the diode connects to the reset pin of the microprocessor, a cathode of the diode connects to the power source, and the fourth resistor connects to the diode in parallel.

16. The temperature control circuit of claim 14, wherein the protection module further comprises a switch and a capacitor, a first terminal of the switch connects to the reset pin of the microprocessor, a second terminal of the switch grounds, and the capacitor connects to the switch in parallel.

17. The temperature control circuit of claim 10, wherein the heating module comprises a heater and a metal-oxide-semiconductor field-effect transistor (MOSFET), a gate of the MOSFET connects to a power source via a first resistor, and connects to an output pin of the microprocessor, a drain or the MOSFET connects to the power source via the heater, and a source of the MOSFET grounds.

18. A temperature control circuit, comprising:
- a microprocessor comprising an output pin, a reset pin, and an input pin;
- a temperature detection circuit comprising a thermistor, and a first switch, the first switch electrically connected to the input pin of the microprocessor;
- a protection circuit connected to the reset pin of the microprocessor; and
- a heating module connected to the output pin of the microprocessor;
- the first switch structured and arranged with the thermistor to be in an on state or an off state according to a temperature value of an electronic device measured by the thermistor, wherein the protection circuit is structured and arranged to send a signal to the reset pin of the microprocessor to selectively control the microprocessor to be in a work state or in a standby state according to the on/off states of the first switch; and
- wherein the heating module turns on/off according to the work state and the standby state of the microprocessor.

19. The circuit of claim 18, wherein the first switch is a transistor, a base of the transistor grounds via the thermistor, and connects to a power source via a first resistor, a collector of the transistor connects to the power source via a second resistor, and connects to the input pin of the microprocessor, and an emitter of the transistor grounds.

20. The temperature control circuit of claim 2, wherein the thermistor connects to a third resistor in parallel.

* * * * *